United States Patent [19]
Barnett et al.

[11] 3,787,008
[45] Jan. 22, 1974

[54] PNEUMATIC TUBE SYSTEM CARRIER WEAR RING CONSTRUCTION

[75] Inventors: Charles B. Barnett, Akron; Pieter J. Ekama, Malvern, both of Ohio

[73] Assignee: Diebold, Incorporated, Canton, Ohio

[22] Filed: July 3, 1972

[21] Appl. No.: 268,830

[52] U.S. Cl. .................................. 243/35, 243/39
[51] Int. Cl. ............................................ B65h 49/26
[58] Field of Search .................... 243/32, 34, 35, 39

[56] References Cited
UNITED STATES PATENTS
| | | | |
|---|---|---|---|
| 590,181 | 9/1897 | Batcheller | 243/39 |
| 567,067 | 9/1896 | Batcheller | 243/35 |
| 1,721,915 | 7/1929 | MacMillan | 243/35 |
| 359,456 | 3/1887 | McLaughlin | 243/34 |

FOREIGN PATENTS OR APPLICATIONS
| | | | |
|---|---|---|---|
| 999,621 | 7/1965 | Great Britain | 243/39 |

*Primary Examiner*—Allen N. Knowles
*Attorney, Agent, or Firm*—Frease & Bishop

[57] ABSTRACT

A wear ring seal construction for a carrier used in a pneumatic tube system, particularly a carrier of the type having a pair of wear rings surrounding the carrier body spaced from each other and from the ends of the carrier. The wear rings each are formed of a plurality of ring layers or laminations of a special material which flexes easily to accommodate out-of-roundness of the tube cross section, and indentations or sharp projections in the interior of the tube wall. The ring layers have alternately large and small diameters and different thicknesses and the arrangement of ring layers preferably is symmetrical about a center plane perpendicular to the ring axis. The wear rings are replaceable and have a minimum contact with the tube inner surface during travel through the tube while providing an efficient seal. Further, the minimum surface contact between wear ring and tube results in a minimum area on the edges of the seal rings for the collection of material which can soil the hands of a user manipulating the carrier when removed from the tube.

3 Claims, 4 Drawing Figures

PATENTED JAN 22 1974　　　　　　　　　　　　3,787,008

3,787,008

PNEUMATIC TUBE SYSTEM CARRIER WEAR RING CONSTRUCTION

CROSS REFERENCE TO RELATED APPLICATIONS

This application shows but does not claim certain arrangements disclosed and claimed in the copending application of Charles B. Barnett and Larry A. Morrison, for Pneumatic Tube Carrier End Closure Construction, filed Dec. 16, 1971, Ser. No. 208,756; and certain other arrangements disclosed and claimed in the copending application of Pieter J. Ekama and Francis L. Brown for Pneumatic Tube System Carrier, filed July 3, 1972, Ser. No. 268,861, Case (D-176).

BACKGROUND OF THE INVENTION

1. Field of the Invention

The invention relates to pneumatic tube systems and to carriers for such systems, and more particularly to the construction of a wear ring for a carrier which accommodates the variations in tube contour and obstructions which heretofore have jammed a carrier in a tube or have broken the seal between carrier and tube; which involves a minimum seal contact between the wear ring and tube while providing an efficient seal; and which may be replaced readily.

2. Description of the Prior Art

Prior art pneumatic tube system carriers frequently have had wear rings of considerable axial thickness formed of compacted felt, or formed of molded relatively rigid plastic material having a desired cross sectional configuration, or formed of other materials adapted to provide a surface which wears against the interior of the tube while moving through the tube while performing its sealing function.

Rapid or uneven wear on carrier wear rings may result from tube joints or tube out-of-roundness which, even though the tube is normally round, occurs at a bend in the tube provided to change the direction of carrier movement. Tube deformations also can result during installation of tubes underground and can cause rapid wear. Sometimes, sharp objects accidentally can project internally of a tube. Such faulty tube joints, out-of-roundness, tube deformation or sharp projections may cause a carrier to jam in the tube when equipped with typical prior art molded plastic wear rings. Even though jamming does not result, the out-of-roundness, tube deformations or sharp projections can result in rapid or uneven wear or destruction of the sealing characteristics of the prior carrier wear rings, leading to frequent replacement of the wear rings where possible or of the carrier.

Furthermore, such wide molded or felt wear rings accumulate particles of dirt, dust, metal, etc., on the ring surfaces, and the dirt frequently soils the hands or gloves of a user handling the carrier when removed from the tube at a terminal, for example when a customer removes a carrier from a tube in connection with carrying out remote banking procedures.

Another prior construction of foreign origin for a carrier held captive in a straight run tube in a nuclear reactor installation adapted to deliver a sample from the interior of a carrier through an always open end of the carrier and within the tube at a terminal station for examination in a separate chamber has been equipped with a series of sealing plates of alternately large and small diameter and uniform thickness held clamped in position by closure screws located at the carrier ends.

This prior construction, however, is completely lacking in any teaching of how to accommodate carrier wear rings for tube out-of-roundness, tube indentations, sharp internal tube projections, etc., without jamming carrier movement or causing undue wear or inefficient sealing.

Thus, a need has existed for a carrier wear ring construction which provides an efficient seal and accommodates tube out-of-roundness, internal indentations and sharp projections without encountering undue wear and which is quiet in operation. No known prior carrier wear ring construction suggests any answer to these problems or provides the indicated operating features.

SUMMARY OF THE INVENTION

Objectives of the invention include providing a new wear ring construction for pneumatic tube system carriers which conform readily to tube deformations without jamming or stopping the carrier within the tube; providing a new carrier wear ring construction which may be located in pairs with the rings spaced from each other and from the ends of the carrier and which rings yield when encountering a tube deformation or indentation which heretofore would be of a magnitude to jam a carrier in a tube; providing a new carrier wear ring construction which may pass over a sharp projection within a tube and accommodate to the sharp projection without breaking the seal between the carrier and tube and without destruction of the wear ring; providing a new carrier wear ring construction which presents minimum soiled surfaces that may be touched by a user handling the carrier when removing it from or replacing it into a tube at a terminal station; providing a new carrier wear ring construction formed of a series of ring layers of flexible material providing a long wear ring life, but which may be replaced readily; and providing a wear ring construction for pneumatic tube system carriers formed of simple and inexpensive parts, which construction achieves the stated objects in an efficient and effective manner, and which solves problems and satisfies needs existing in the art.

These and other objects and advantages may be obtained by the pneumatic tube system carrier wear ring construction, the general nature of which may be stated as including in wear ring means adapted preferably to be replaceably mounted as a pair of wear rings on the body of a pneumatic tube system carrier spaced from each other and from the ends of the carrier; each wear ring comprising a plurality of ring layers formed of flexible material; the flexible material including laminated neoprene impregnated cotton duck; the ring layers comprising contact and spacer ring layers, respectively, having alternately large and small diameters; small diameter spacer ring layers having different thicknesses; the arrangement of ring layers being symmetrical about a center plane perpendicular to the wear ring axis, and the ring layers being mechanically held together.

BRIEF DESCRIPTION OF THE DRAWING

A preferred embodiment of the invention — illustrative of the best mode in which applicants have contemplated applying the principles — is set forth in the following description and shown in the drawing, and is

3 particularly and distinctly pointed out and set forth in the appended claims.

Figure 1:
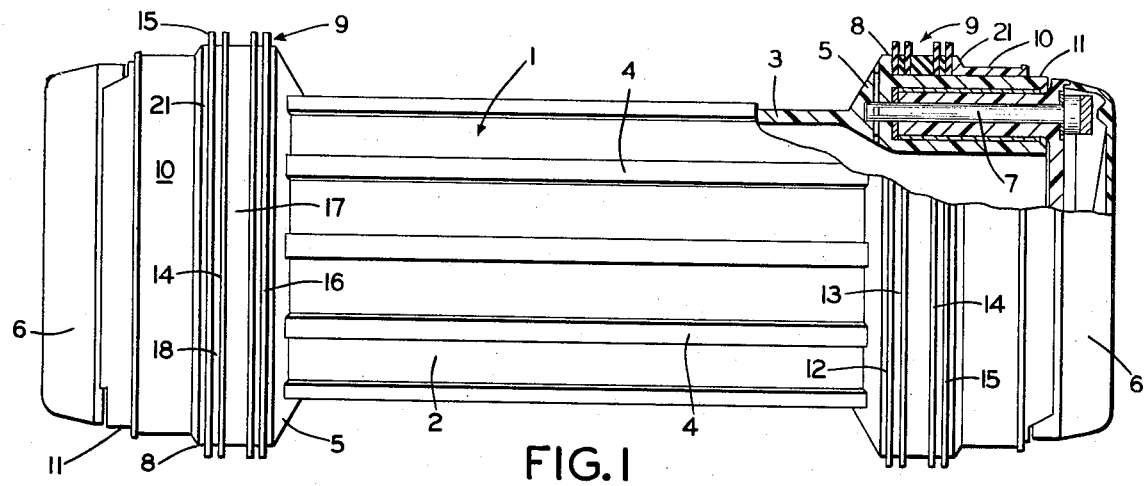
Figure 2:
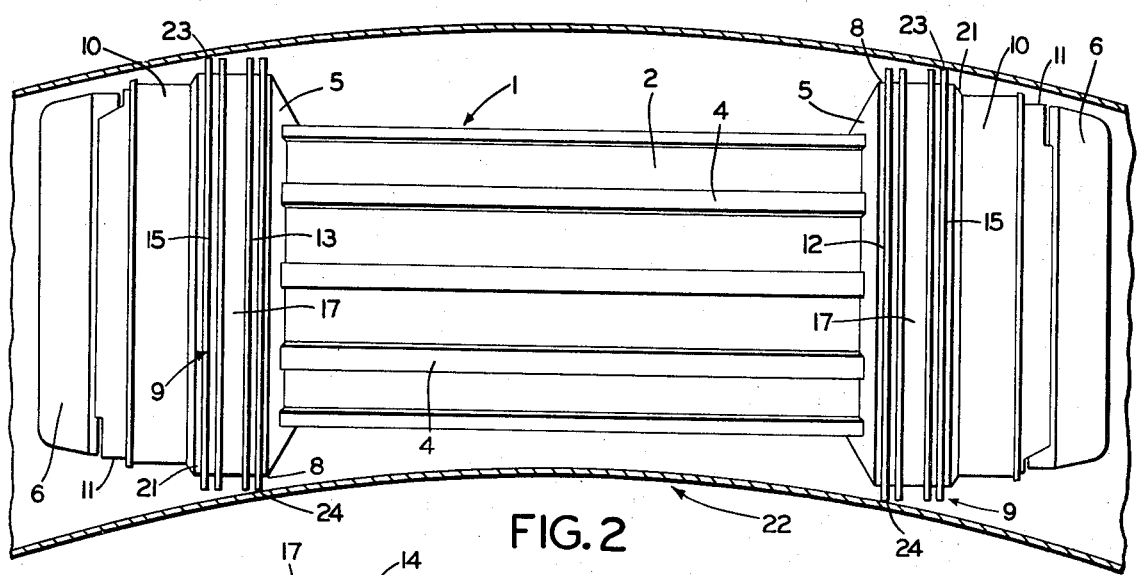
Figures 3, 4:
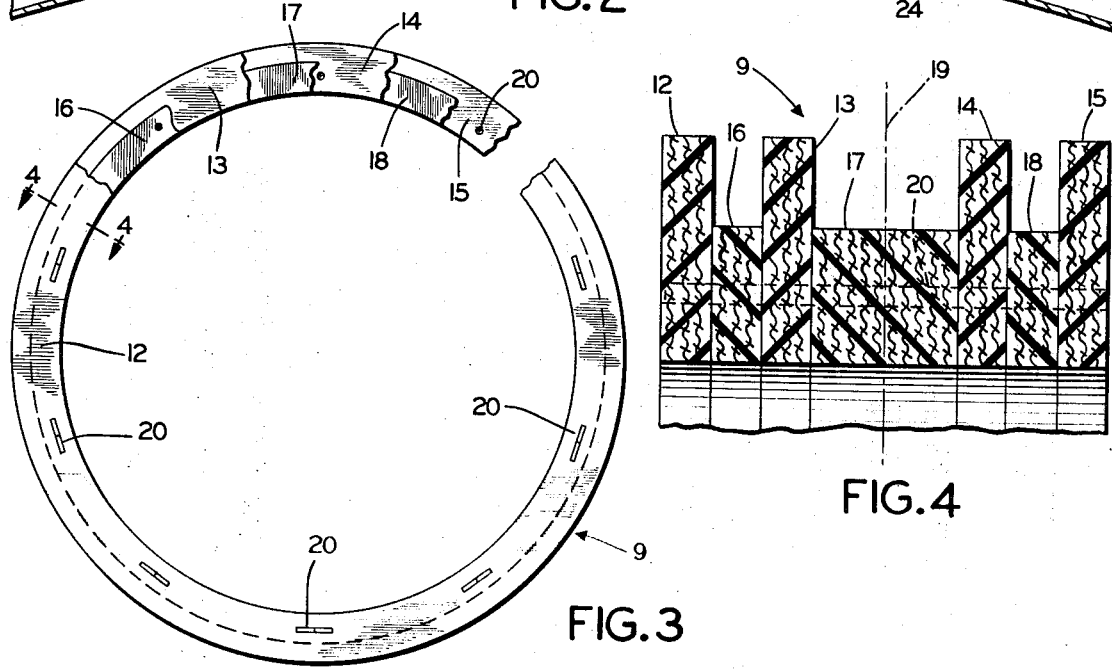

FIG. 1 is a side elevation of a carrier, with parts broken away and in section to show the improved wear ring structure;

FIG. 2 is a view similar to FIG. 1 showing the manner in which the wear rings provide a carrier-tube seal when the carrier moves around a tube bend;

FIG. 3 is an end view of the wear ring assembly with parts broken away; and

FIG. 4 is an enlarged sectional view on the line 4—4, FIG. 3.

Similar numerals refer to similar parts throughout the drawing.

DESCRIPTION OF THE PREFERRED EMBODIMENT

A carrier is generally indicated at 1 of a type used in pneumatic tube systems and such as shown for example in said copending applications. Carrier 1 has a carrier body 2 with a side wall 3 and preferably has a plurality of spaced reinforcing ribs 4 which extend along the side wall 3 between the enlarged end portions 5. The open ends of the carrier body 2 are closed by end closures 6 pivotally mounted at 7 on each enlarged end portion 5, preferably as shown in said application Ser. No. 208,756.

An annular shoulder 8 is formed on each end portion 5 against which an improved wear ring generally indicated at 9 is seated and retained by a collar or retaining ring 10, mounted by a press fit on the outer cylindrical surface 11 of the end portion 5. The retaining ring 10 preferably is bonded by an adhesive to the cylindrical surface 11. Retaining ring 10, however, can be removed from the carrier body 2 to replace the wear ring 9 accompanied by replacement only of the retaining ring 10.

The carrier body 2, end closure 6, and retaining ring 10 may be formed as molded lightweight, rugged plastic material components.

Each wear ring 9 in accordance with the invention is formed of a plurality of ring layers of neoprene impregnated cotton duck material which flexes easily but has excellent wear resistance. The ring layers themselves each have a laminated structure, being formed of a number of thicknesses of the cotton duck pressed or molded and bonded together by the neoprene impregnating material to form an integrated body.

As shown particularly in FIGS. 3 and 4, the wear ring 9 is composed of large diameter contact ring layers 12, 13, 14 and 15 and intervening smaller diameter spacer ring layers 16, 17 and 18. The ring layers 12 to 18 are assembled together as shown in FIG. 4, symmetrical about a plane indicated by the dot-dash line 19 perpendicular to the axis of the rings.

As shown, the ring layers 12–18 may be mechanically secured or held together by a series of rivet staples 20. Alternatively, the various ring layers 12–18 may be held by bonding together in the assembly shown by adhesive between adjacent layers, or the layers may be molded together by assembling in a green state before vulcanizing. In any event, the layer assembly of the wear ring 9 has the layers thereof secured to one another so that no one of the layers 12, 13, 14 or 15 can be torn from the assembly when encountering a sharp object projecting interiorly of a pneumatic tube through which a carrier 1 may be traveling.

4

The flexibility of the neoprene impregnated cotton duck material from which the ring layers are formed is one of the critical aspects of the invention in that such material permits any one of the ring layers 12, 13, 14 or 15 to flex and accommodate to an indentation in, sharp projection within, or out-of-roundness of a pneumatic tube through which a carrier 1 moves without destroying the seal provided by the remaining layers, as the wear ring 9 passes over any such obstruction; and enables the particular ring layer which has flexed, to spring back to normal position.

As shown in FIG. 1, the outer diameter of the spacer ring layers 16, 17 and 18 preferably is the same as the diameter of the flange forming the shoulder 8 on the carrier body 2, and of the flange 21 on the retaining ring 10.

Another critical aspect of the improved wear ring construction is the irregular spacing of contact rings 12, 13, 14 and 15; the rings 13 and 14 being spaced farther apart, as shown, than the rings 12 and 14, or 14 and 15. This irregular spacing eliminates a whistle sound which may occur when a carrier with evenly spaced contact rings is held in the pneumatic tube or a terminal thereof. However, despite the uneven spacing, the wear ring structure is symmetrical in cross section with respect to the plane 19, as described.

The outer diameters of the contact ring layers 12, 13, 14 and 15 preferably are the same as the effective diameter of the pneumatic tube through which the carrier travels. For example, a typical 4½ inch OD pneumatic tube, because of ovality particularly occuring at tube bends, and because of variations in roundness throughout the length of a tube, and, when the tube wall thickness is taken into consideration, can be assumed to have an effective ID of 4.275 inch. The diameters of the contact ring layers 12, 13, 14 and 15 of the wear ring 9 could have a diameter range within preferred limits of 4.275 to 4.300 inches, for a carrier 1 used in such a tube.

These considerations and the described critical features of the improved wear ring structure 9, provide a carrier of the type in FIG. 1, equipped with improved wear rings 9 spaced from the carrier ends, to move through an extremely sharp tube bend, as shown in FIG. 2.

In FIG. 2 the tube is indicated at 22 and the carrier 1 is shown passing around the sharp tube bend illustrated. The wear rings 9 contact the tube inner surface at the bend in a manner such that the outer contact ring layers 15 flex and engage the inner surface of the tube 22 as indicated at 23 in the outer zone of the bend, while the inner contact ring layers 12 of the wear rings 9 flex and contact the inner zones 24 of the tube 22.

In this manner, effective air propulsion of the carrier 1 through the tube 22 occurs, even in going around tube bends, without substantial wear on the wear rings.

The outer edges of the contact rings 12, 13, 14 and 15 where contact and wear occurs, are also the locations of the accumulation of dirt, dust, etc., which can soil the hands or gloves of an individual handling the carrier. Since only a minimum amount of surface is present, there is a minimum susceptibility of soiling the hands of a user removing the carrier from or placing it in the terminal of a tube system.

The ability of wear ring contact layers to flex, and the nature of the material from which the wear ring layers are formed, contributes to providing a much longer life for the wear rings 9 than heretofore obtained with prior wear ring structures.

Accordingly, the improved carrier wear ring construction provides a wear ring which will conform by flexing to slight tube deformations without stopping the carrier; provides a wear ring which avoids carrier jamming in a pneumatic tube such as may occur when typical prior plastic wear rings of relative rigid material encounter tube deformations; provides a wear ring construction which yields sufficiently to accommodate tube out-of-roundness, tube ovality, tube indentations and sharp projections internally of the tube so that the carrier passes such obstructions without breaking the seal; provides a construction which presents a minimum chance of soiling the hands of a user while handling a carrier at a tube terminal; provides a wear ring construction which has a substantially longer life than prior art wear rings; provides a construction which is effective, inexpensive and efficient in construction and use, and which achieves the objectives stated and eliminates difficulties characterizing prior constructions, and solves problems and obtains the new results described.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact details of construction shown or described.

Having now described the features, discoveries and principles of the invention, the manner in which the improved wear ring is constructed and operates, the characteristics of the new construction, and the advantageous, new and useful results obtained; the new and useful structures, devices, elements, arrangements, parts and combinations are set forth in the appended claims.

We claim:

1. Wear ring construction for a pneumatic tube system carrier of a type of which a pair of spaced wear rings is mounted in spaced relation on the body of a carrier with each ring spaced from an end of the carrier so that the carrier may move through a pneumatic tube and around sharp bends therein without jamming incident to tube out-of-roundness and internally projecting indentations in the tube wall; each wear ring including a plurality of ring layers; the layers comprising alternate contact and spacer ring layers respectively having large and small diameters; the ring layer arrangement being symmetrical about a center plane perpendicular to the wear ring axis; the ring layers being formed of neoprene impregnated cotton duck material and molded together as an integral unit by vulcanization; the molded wear ring unit being removably mounted on the carrier; each contact ring layer having its outer end spaced from adjacent contact ring layer outer ends at all times when the layers are at rest and when deflected by tube bends and tube indentations.

2. The construction defined in claim 1 in which there are four contact ring layers and three spacer ring layers, and in which the middle spacer ring layer is thicker than the remaining spacer ring layers.

3. The wear ring construction defined in claim 1 including retaining rings for clamping and holding the two wear rings on a carrier; and in which the retaining rings may be detached from a carrier on which they are mounted whereby the wear rings may be replaced.

* * * * *